(12) United States Patent
Kurtz et al.

(10) Patent No.: US 6,725,825 B1
(45) Date of Patent: Apr. 27, 2004

(54) METHOD AND SYSTEM FOR CONTROLLING COMBUSTION MODE IN AN INTERNAL COMBUSTION ENGINE

(75) Inventors: Eric Matthew Kurtz, Dearborn, MI (US); Jialin Yang, Canton, MI (US); Lifeng Xu, Farmington Hills, MI (US); Richard Eugene Baker, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,598

(22) Filed: Nov. 1, 2002

(51) Int. Cl.$^7$ ................................................. F02M 11/00
(52) U.S. Cl. ........................ 123/295; 123/305; 123/443
(58) Field of Search ................................ 123/295, 305, 123/443

(56) References Cited

U.S. PATENT DOCUMENTS

| | | | | |
|---|---|---|---|---|
| 5,803,048 A | * | 9/1998 | Yano et al. ................. | 123/443 |
| 5,992,372 A | * | 11/1999 | Nakajima ................... | 123/295 |
| 6,324,835 B1 | * | 12/2001 | Surnilla et al. ............. | 123/443 |
| 6,360,713 B1 | * | 3/2002 | Kolmanovsky et al. ..... | 123/295 |
| 6,390,054 B1 | * | 5/2002 | Yang .......................... | 123/305 |

* cited by examiner

*Primary Examiner*—Erick Solis
(74) *Attorney, Agent, or Firm*—Diana D. Brehob

(57) ABSTRACT

A method and system for controlling combustion mode in an internal combustion engine is disclosed. A method for controlling a multi-cylinder internal combustion engine includes operating a portion of the cylinders according to a first combustion mode and operating a second portion of the cylinders according to a second, different combustion mode. The net torque produced by the cylinders equals driver demanded torque. By this invention, a first combustion mode, which has a desirable combustion characteristic such as high fuel economy or low emissions, but which cannot provide driver demanded torque if used in all cylinders, can be used in combination with a second combustion mode, thereby meeting driver demand for torque and gleaning the benefits of the first combustion mode.

34 Claims, 6 Drawing Sheets

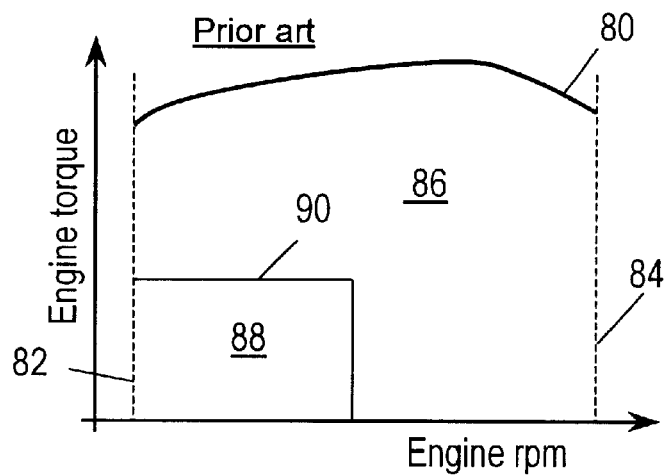
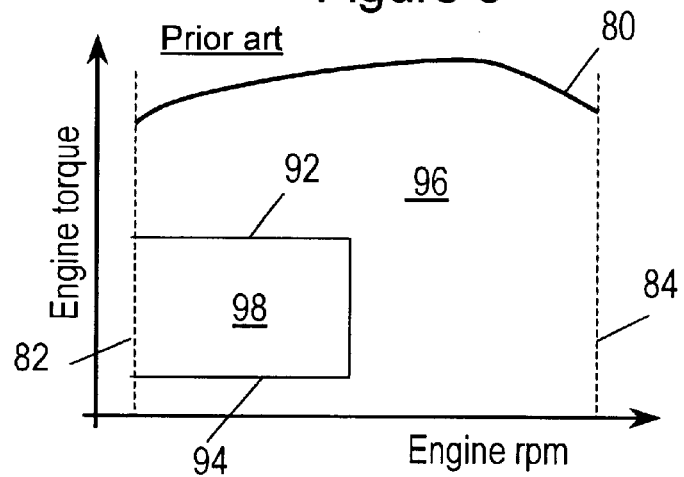

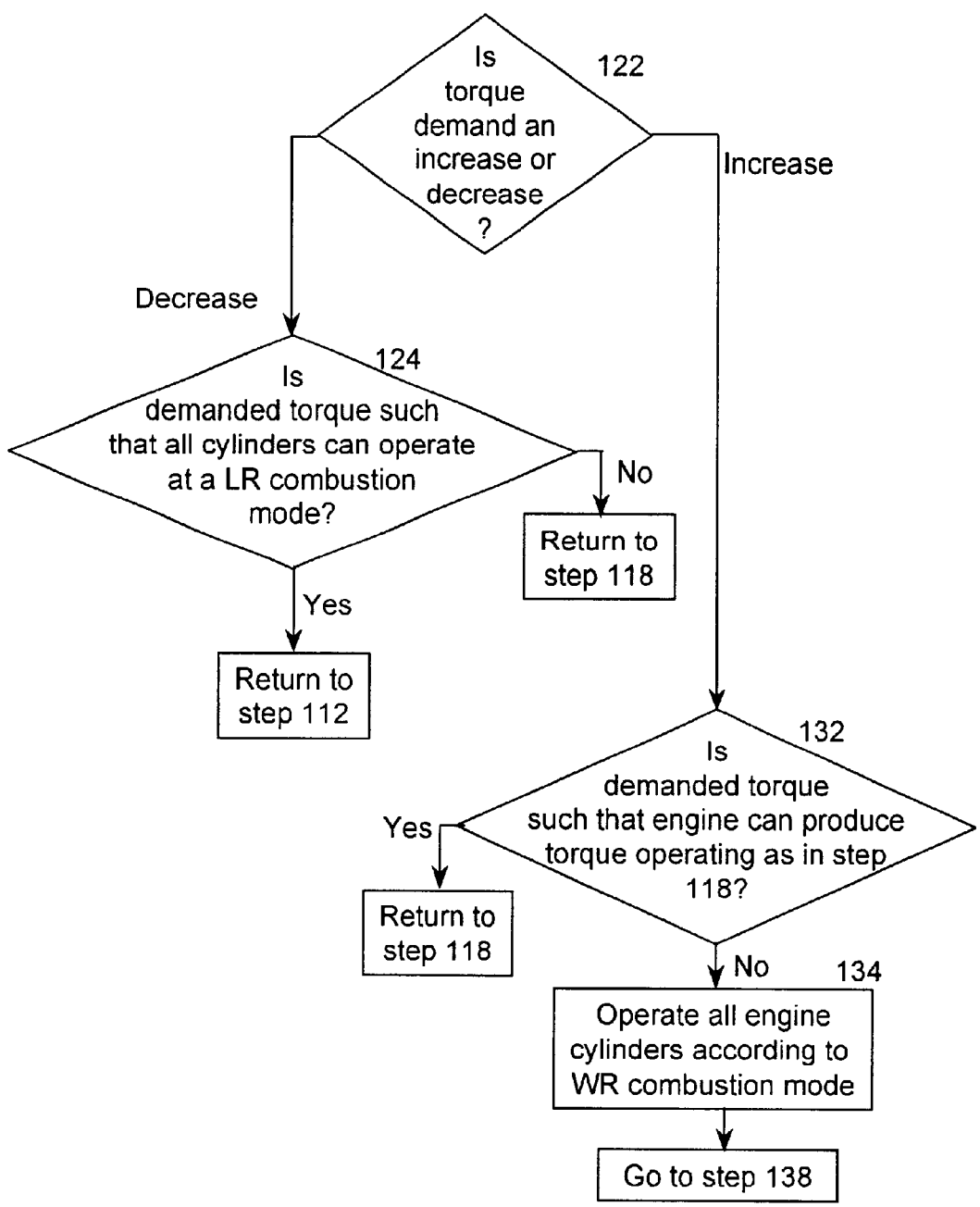

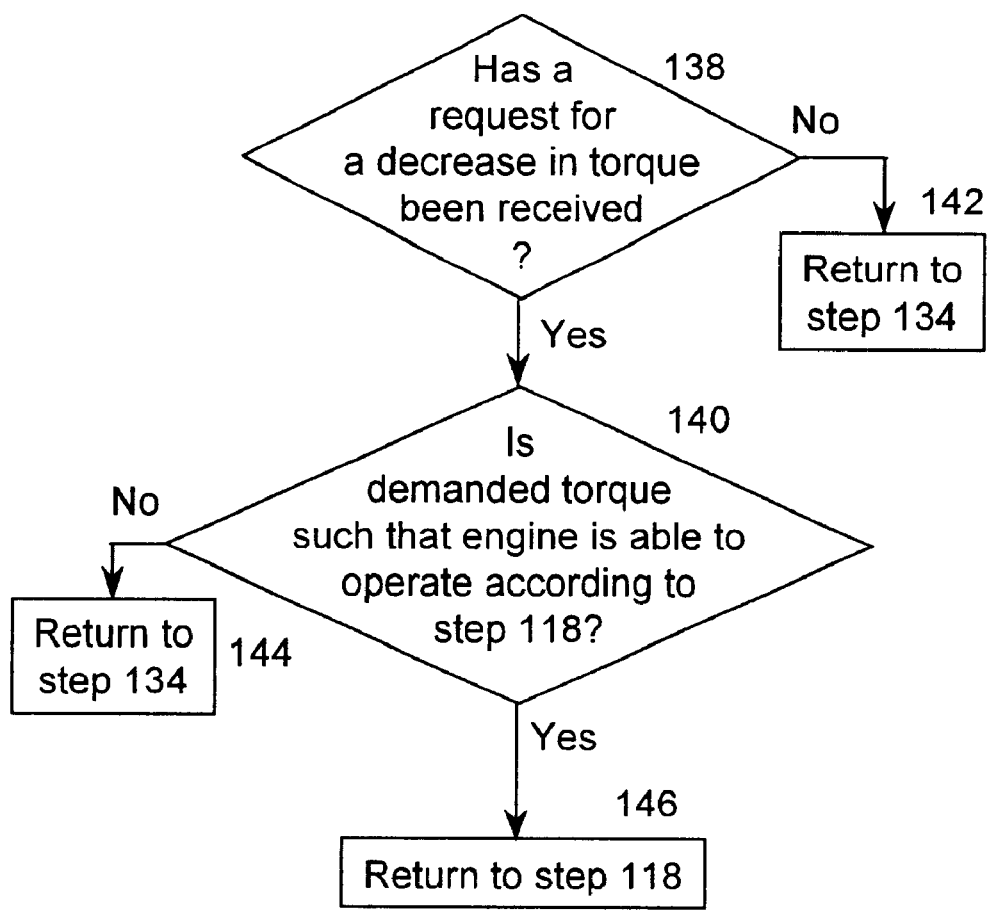

METHOD AND SYSTEM FOR CONTROLLING COMBUSTION MODE IN AN INTERNAL COMBUSTION ENGINE

BACKGROUND OF THE INVENTION

1. Field of the Invention

The present invention relates to internal combustion engines and more particularly to methods and systems for controlling combustion modes used in the various cylinders of such engines.

2. Background of the Invention

As is known in the art, an engine may be designed to operate in one or more combustion modes. There are combustion modes providing operation over a wide range in torque and speed. There are other combustion modes, which, while used to operate in a narrower range of torque and speed, have other desirable characteristics, such as low emissions, high fuel efficiency, or smooth combustion. To exploit the advantages of the combustion modes having the limited operating range, it is known in the art to operate the engine in the limited range (LR) combustion mode when possible, and switch to a wide range (WR) combustion mode having the wide range of speed and torque when dictated by demand on the engine.

More particularly, when an operator demanded engine torque is within the operating region for a narrow range of speed and torque, all cylinders operate in the LR combustion mode. When operator demanded torque is outside of the LR combustion mode, all engine cylinders are operated according to a wide range (WR) combustion mode. As mentioned above, the LR combustion mode has desirable combustion characteristics, e.g., low emissions, high fuel efficiency, quiet combustion and these characteristics are used only when the engine operates within the operating limits of the LR combustion mode. Once torque demand exceeds the capability of the LR combustion mode, the engine switches all cylinders to the WR combustion mode.

SUMMARY OF THE INVENTION

The inventors have recognized a method for controlling a multi-cylinder internal combustion engine by operating a first group of cylinders according to a first combustion mode and operating a second group of cylinders according to a second, different combustion mode with the total torque provided by said first and second groups substantially equals an operator demanded engine torque. As an example, the first combustion mode is a LR combustion mode and the second combustion mode is a WR combustion mode with the torque provided by the LR combustion mode being less than operator desired torque and the torque provided by the WR combustion mode being greater than operator desired torque. Thus, the cylinders operating in the WR combustion mode make up the deficit of cylinders operating at the LR combustion mode to thereby result in the effect of all cylinders meeting operator demand. The benefit of the approach is that the desirable operating characteristic, e.g., fuel efficiency, of the LR combustion mode is achieved in the first group of engine cylinders when operator demanded torque is outside of its normal operating range thereby improving these characteristics compared with those characteristics in an engine having all cylinders operating with the WR combustion mode.

In accordance with the invention, a method is provided for controlling an internal combustion engine having a plurality of cylinders. The method includes operating a portion of the cylinders according to a first combustion mode and operating a second group of the cylinders according to a second, different combustion mode.

The method further includes operating the plurality of cylinders to produce from the engine a net torque substantially equal to an operator demanded engine torque.

In one embodiment, one of the combustion modes is a homogeneous-charge, compression-ignition combustion mode in which fuel and oxidizer are substantially homogeneously mixed prior to ignition and ignition occurs via autoignition and the other one of the combustion modes is a homogeneous-charge, spark-ignition combustion mode in which fuel and oxidizer are substantially homogeneously mixed prior to ignition and ignition occurs via a spark. A primary advantage of this embodiment is that the fuel economy benefit of HCCI is extended.

In one embodiment, the second mentioned one of the combustion modes is a heterogeneous-charge, compression-ignition combustion mode in which fuel and oxidizer are mostly unmixed at the time of ignition and ignition occurs via autoignition. An advantage of this embodiment is low levels of regulated emissions compared with a system in which heterogeneous-charge, compression-ignition is used solely.

In one embodiment, the first combustion mode is a direct-injection, stratified-charge combustion mode in which fuel and oxidizer are mostly unmixed at the time of ignition and ignition occurs via spark ignition. The second combustion mode is a homogeneous-charge, spark-ignition combustion mode in which fuel and oxidizer substantially homogeneously mixed prior to ignition and ignition occurs via spark ignition. A primary advantage of this embodiment is a fuel efficiency advantage.

In accordance with another feature of the invention, a method is provided for controlling torque in an internal combustion engine having a plurality of cylinders. The method includes operating the plurality of cylinders according to a first combustion mode, such engine operating to produce a torque within a range of torque. In response to a demand for a change in torque to a torque outside of such range, the engine transitions from operating the engine with the plurality of cylinders in the first combustion mode to operating such engine with a one portion of such plurality of cylinders remaining in the first combustion mode while a different portion of the cylinders transitions operate in a different combustion mode.

In one embodiment, the net torque provided by engine cylinders substantially equals the demanded torque.

Yet another embodiment of the present invention is a method for controlling torque in a multi-cylinder internal combustion engine in which a first portion of engine cylinders operate at a first combustion mode and a second portion of cylinders operate at a second combustion mode, which is different than the first combustion mode. In response to a demand for a change in torque, the second portion of engine cylinders transition from the second combustion mode to the first combustion mode.

Another advantage of the present invention is that when operator demanded torque calls for a torque trajectory, which goes outside of the torque range for the LR combustion mode, the present invention allows for a smoother transition out of the LR combustion mode. That is, if the engine is operated at the LR combustion mode and a higher torque is demanded, all of the cylinders are changed to a WR combustion mode, a portion of engine cylinders transition to the WR combustion mode while the remaining cylinders continue to operate in the LR combustion mode, thereby easing the transition process. If a further increase in torque is required in which none of the cylinders can operate in the LR combustion mode and still provide desired torque, only the portion operating under the LR combustion mode makes a transition.

According to yet another embodiment for controlling an internal combustion engine is a system having an electronic control unit operably connected to engine cylinders. The electronic control unit commands a first portion of cylinders to operate at a first combustion mode and a second portion of cylinders to operate at a second combustion mode. In response to a demand for a change in torque, the electronic control unit commands a transition to operating the engine with a third portion of the cylinders in the first combustion mode and a fourth portion of the cylinders in the second combustion mode; the number of cylinders in the first and third portions of cylinders being unequal. The first combustion mode is either a limited range combustion mode or a wide range combustion mode and the second combustion mode is the other, i.e., different from the first combustion mode. An advantage of this aspect of the present invention is that a transition can be made on a cylinder-by-cylinder basis. As an example, a six-cylinder engine operating with a 1:5 ratio of cylinders in the first:second combustion modes can transition through the following steps: 2:4, 3:3, 4:2, and 5:1. In this way, transitions are accomplished in a more seamless and less abrupt manner.

The above advantages, other advantages, and features of the present invention will be readily apparent from the following detailed description of the preferred embodiments when taken in connection with the accompanying drawings.

BRIEF DESCRIPTION OF DRAWINGS

The advantages described herein will be more fully understood by reading an example of an embodiment in which the invention is used to advantage, referred to herein as the Detailed Description, with reference to the drawings wherein:

FIG. 2 is a graph showing an engine operating map for a direct-injection, stratified-charge engine according to the prior art;

FIG. 3 is a graph showing an engine operating map for a homogeneous-charge compression-ignition engine according to the prior art;

FIGS. 6A–6C are flowcharts useful in understanding the present invention.

DETAILED DESCRIPTION

Figure 1:
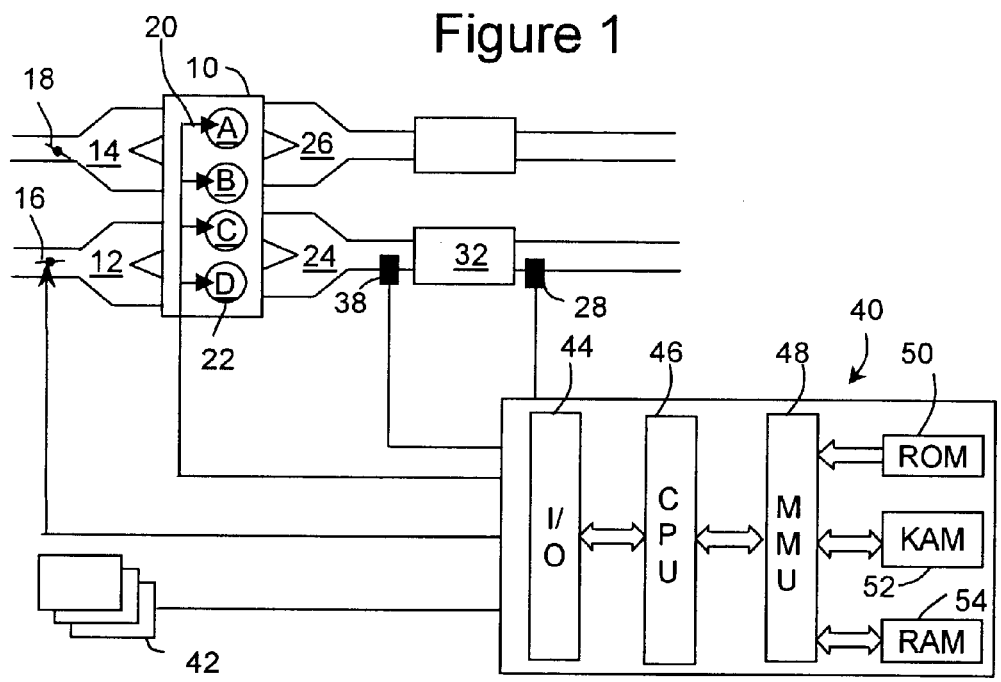
FIG. 1 is a schematic of an engine equipped according to the present invention.

Referring now to FIG. 1 a multi-cylinder internal combustion engine 10 is shown. By way of example, engine 10 is shown to have four cylinders 22, designated A, B, C, and D. As will be described in more detail below, engine 10 has the capability to operate under more than one combustion mode simultaneously, i.e., one combustion mode used in at least one of the cylinders and a different combustion mode in at least one different cylinder. That is, while engine 10 is able to operate with all cylinders in a common combustion mode, the engine 10 is adapted to operate with one portion of the cylinders according to a first combustion mode and a second group of the cylinders according to a second, different combustion mode. In either case, the plurality of engine cylinders produce a net torque substantially equaling an operator demanded engine torque.

More particularly, FIG. 1 shows, by way of example, a 4-cylinder engine 10. Engine 10 is supplied air through intake manifolds 12 and 14 with throttle valves 16 and 18 controlling air flow through manifolds 12 and 14, respectively. Typically, engines are equipped with an exhaust gas recirculation (EGR) system (not shown) which has an EGR duct leading from the engine's exhaust system to the intake system. Gases flow though the duct due to pressure in the intake being less than that in the exhaust. Flow through the EGR system is controlled by an EGR valve. Fuel injectors 20 supply fuel into cylinders 22 of engine 10; such an arrangement is commonly called direct injection. Alternatively, fuel injectors 20 supply fuel into the intake manifold, which is commonly referred to as port fuel injection.

Exhaust gases from engine 10 are exhausted into exhaust manifolds 24 and 26. In the exhaust duct which comprises manifold 24, elements 28 and 38 are exhaust gas component sensors and element 32 is an exhaust gas aftertreatment device. Similar elements are provided in the exhaust duct which comprises exhaust manifold 26.

Continuing to refer to FIG. 1, electronic control unit (ECU) 40 is provided to control engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve position, spark plug timing (in the event that engine 10 is a spark-ignition engine), reductant injection, and others. Sensors 42 communicating input through I/O interface 44 may be indicating piston position, engine rotational speed, vehicle speed, coolant temperature, intake manifold pressure, accelerator pedal position, throttle valve position, air temperature, exhaust temperature, exhaust stoichiometry, exhaust component concentration, and air flow. Specific sensors shown in FIG. 1 are exhaust gas component sensors 28 and 38. In one embodiment, the exhaust gas component sensors are NOx sensors. Alternatively, the sensors are reductant sensors. In another embodiment, the sensors are exhaust gas oxygen sensors. In a further embodiment, a combination of sensors is installed in place of any of elements 28 and 38. Some ECU 40 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 40 may contain multiple ROM 50, RAM 54, and KAM 52 coupled to MMU 48 or CPU 46 depending upon the particular application.

Engine 10 is here a four-stroke cycle engine, in which the engine completes two revolutions for each power stroke. The four-strokes are: a downward movement of the piston for an intake stroke, an upward movement of the piston for a compression stroke, a downward movement of the piston for an expansion or power stroke, and an upward movement of the piston for an exhaust stroke. A revolution of the engine comprises an upward and a downward movement of the piston. Combustion is initiated, typically, at the end of the compression stroke with the majority of the energy release from combustion occurring during the expansion or power stroke.

The following table provides information distinguishing four known combustion modes, two wide-range combustion modes and two limited-range combustion modes:

[t1]

| Combustion mode | Operating range | Desirable Characteristic | Fuel-air state | Ignition source | Location of fuel injector |
|---|---|---|---|---|---|
| Homogeneous-charge, compression-ignition (HCCI) | Limited range (LR) | Low NOx, soot, high fuel efficiency | Mixed | Auto-ignition | Port or in-cylinder |
| Homogeneous-charge, spark-ignition | Wide range (WR) | | Mixed | Spark | Port or in-cylinder |
| Direct-injection, stratified-charge (DISC) | Limited range (LR) | High fuel efficiency | Unmixed | Spark | In-cylinder |
| Heterogeneous-charge, compression-ignition (diesel) | Wide range (WR) | | Unmixed | Auto-ignition | In-cylinder |

As shown in the table above, the HCCI combustion mode provides high fuel efficiency (particularly in relation to homogeneous-charge, spark-ignition combustion) and low NOx emission and soot emission (particularly in relation to diesel combustion). The difficulty with these LR combustion modes is that they cannot operate over a wide operational range. Thus, it is known to one skilled in the art, to operate an engine at a LR combustion mode when within its limited range and to switch to operation at a WR combustion mode when outside the LR combustion mode's limited range.

The term homogeneous charge indicates that the fuel and the air are premixed prior to ignition. In practice, the mixing of the fuel and air in homogeneous-charge systems is less than complete at the time of ignition. In contrast, fuel and air are purposely kept unmixed in DISC and diesel combustion modes. In DISC the fuel and air are allowed to mix in a region near the spark plug. If the fuel and air were to be mixed to the extent that occurs in HCCI, for example, the mixture is unable to support propagation of a flame emanating from the spark plug. Fuel is purposely injected late in the compression stroke in a diesel engine. If the fuel were introduced earlier, the fuel would prematurely autoignite. In the later portion of diesel combustion, the fuel combusts as it comes in contact with air. Although the terms homogeneous charge and heterogeneous charge are not absolute, that is homogeneous charge is not completely premixed and heterogeneous charge is not completely separated, there is a considerable difference between the two in the degree of mixedness and is well known to those skilled in the art. For example, at the time of ignition in heterogeneous combustion, pockets of significant size in the cylinder contains substantially no fuel; whereas, that is not the case with homogeneous combustion.

Autoignition refers to the propensity of the fuel to ignite spontaneously due to compression heating during a compression stroke. The timing of autoignition is controlled primarily by the temperature of the gases trapped in the combustion chamber, the quantity of exhaust gases retained in the combustion chamber, and the fuel's susceptibility to autoignite in an HCCI engine. In the diesel engine, the timing of autoignition is controlled primarily by the fuel injection timing, the fuel injection characteristics (e.g., droplet size), and the fuel's susceptibility to autoignite.

Ignition in both DISC and homogeneous-charge, spark-ignition engines are initiated by a spark plug. The ensuing combustion occurs by a flame front propagating through the fuel-air mixture.

Because both DISC and diesel combustion modes depend on the fuel and air being mostly unmixed, fuel is injected into the air trapped in the cylinder during the compression stroke of the cylinder, thus allowing little time for fuel air mixing. In contrast, HCCI and homogenous-charge, spark-ignition engines depend on the fuel and air being substantially mixed to provide a substantially homogeneous mixture prior to ignition. This can be accomplished with injection into the cylinder. However, the fuel injection occurs earlier in the cycle to allow time for mixing, e.g., during the intake stroke. Alternatively, the fuel can be injected into the port and brought into the combustion chamber during intake. The fuel-air mixing is enhanced by the turbulence generated by the circuitous path that the fuel and air travel in passing through the intake valve.

The combustion modes described in the table are examples and not intended to be limiting. In the art are known many more combustion modes, which are also LR combustion modes. Examples of other LR combustion modes include:

MK combustion. This method uses high EGR rates, high swirl, and high fuel injection pressure. The first of these ensures low NOx emissions and long mixing times; the latter two ensure that the fuel is well mixed with air prior to ignition.

Smokeless rich combustion. Uses high EGR rates, late fuel injection, and low compression ratio to keep the combustion temperatures low so that soot formation is avoided, even in rich combustion zones.

Partial HCCI. Part of the fuel is injected during the compression stroke to allow mixing so that a lean mixture is created. The remainder of the fuel is injected and burned as is typical in diesel engines.

Referring now to FIG. 2, an engine operating map for a DISC engine is shown with having as the X-Y axes engine speed and torque, respectively. Engine operation with such DISC engine is limited to a lower operating speed 82 and an upper operating speed 84. The maximum torque that the DISC engine can produce is shown as curve 80. In accordance with the prior art, the DISC combustion mode is not used over the entire operating range. Instead, DISC is used in region 88 and all cylinders operate in another combustion mode in region 86. Although region 88 is less extensive than region 86, a large fraction of engine operation falls into region 88 during typical engine operation. The upper threshold torque, at which DISC is used, is shown as line 90 in FIG. 2. Operation at torques greater than the upper threshold torque leads to high soot and NOx in the exhaust because the amount of air available in the cylinder becomes insufficient to support DISC combustion.

Referring now to FIG. 3, an engine operating map for a HCCI engine is shown. The map is similar to that discussed in regards to FIG. 2. However, region 98, in which HCCI is used, has, both a lower threshold torque 94 and an upper threshold torque 92. The lower threshold is misfire or limited by unstable combustion. The upper threshold is limited by combustion harshness. By way of example, harshness is based on a rate of pressure rise in the combustion chamber. That rate is a time rate of change (dp/dt) or a crank angle rate of change (dp/d(theta)). Typically, an upper threshold value is established, above which combustion is considered too harsh to use HCCI. Specific reasons for the torque boundaries for HCCI and DISC operation are discussed above. In general, though, LR combustion modes are not used outside their ranges because they fail to provide an acceptable level of one or more performance parameters. Example performance parameters are: combustion harshness, combustion stability, fuel efficiency, soot emission, NOx emission, CO emission, hydrocarbon emission, propensity to misfire, noise, and vibration. The acceptable level is based on meeting emission regulations, design targets, etc.

Both FIGS. 2 and 3 show regions 86, 96, respectively, in which all cylinders operate in a WR combustion mode and regions 88, 98, respectively, where all cylinders operate in a LR combustion mode. However, as noted above, the DISC engine operates in region 88 and the HCCI engine operates in region 98 and thus both are considered as LR combustion mode engines. It should be noted that the operating maps can be broken up into more regions having a plurality of WR combustion mode regions and a plurality of LR combustion mode regions. In any event, in accordance with the prior art, all cylinders operate in the same combustion mode.

Figure 4:
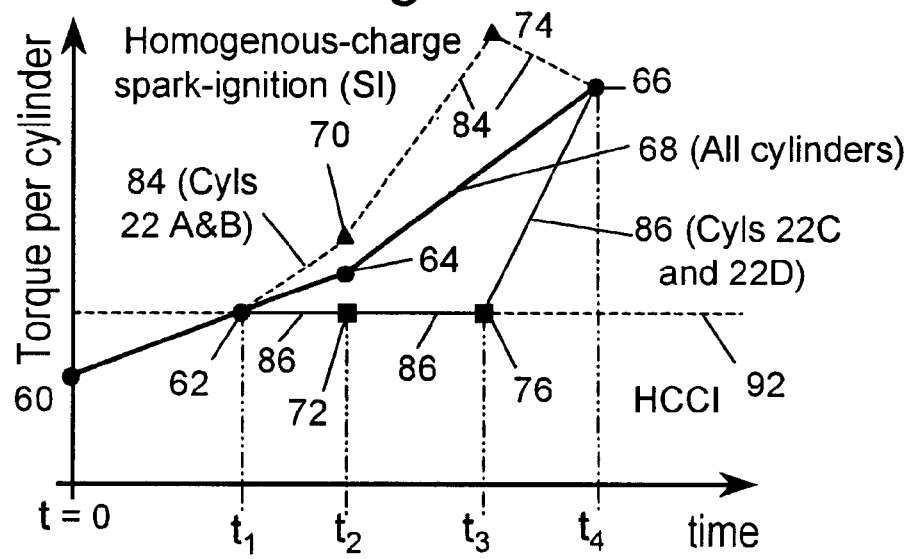
FIG. 4 is a graph of a torque trajectory according to the present invention.

Referring now to FIG. 4, a torque trajectory for engine 10 is shown, according to the invention. The x-axis indicates time and the y-axis indicates a torque per cylinder basis. Dashed line 92 shows the upper limit torque for a LR combustion mode, here HCCI operation (the upper limit of which corresponds to line 92 in FIG. 3). Below line 92, torque can be produced by HCCI operation. Above line 92, torque is produced by a WR combustion mode, here homogeneous-charge, spark-ignition operation (shorthand notation of Si used in the present example). The discussion below focuses on HCCI, but applies to all LR combustion modes. For this illustration, the engine is operating at point 60 at time, t=0. Due to driver demand, the engine is called upon to make a change in torque, which is shown by torque trajectory 68 in FIG. 4. Desired average cylinder torque proceeds from point 60 to point 66, which is here greater than the torque level indicated in FIG. 3 by line 94. Torque trajectory 68 shows the average torque per cylinder that provides total engine torque desired. This average torque per cylinder can be provided when all cylinders provide the same torque or when some cylinders provide more than average torque and some less than average torque such that averaging over the cylinders matches the desired average torque. To achieve the desired average torque, according to the prior art, the engine starts at point 60, in which all cylinders are operating at HCCI. Torque is then increased to point 62 at the intersection of line 92 and torque trajectory 68. At such point of intersection 62, further torque increase is not possible without making a transition in combustion mode from the HCCI combustion mode. Thus, according to prior art methods, all engine cylinders make a transition from HCCI operation to SI operation. Torque is, then, able to be increased from the point of intersection to points 64 and 66. With the four-cylinder example, each one of the four cylinders produces one-fourth the torque required to provide desired net torque from the engine.

According to an aspect of the present invention, the desired average torque trajectory 68 is achieved by: operating all engine cylinders at HCCI from point 60 to the point of intersection 62. It is noted that one pair of the four cylinders, here cylinders 22A and 22B, produce together one half the torque, and the other pair of cylinders 22C and 22D produce the other half of the torque, here the same level of torque as produced by cylinders 22A and 22B. When torque per cylinder exceeds intersection point 62 at time $t_1$, a portion of engine cylinders, 22A–22D, here cylinders 22A and 22B make a transition from HCCI to SI operation, i.e., operating along torque trajectory 84 from point 62 to point 70 at time $t_2$. The remaining cylinders, 22C and 22D, continue to operate in HCCI mode, operating along line 86 from point 62 to 72 at time $t_2$. From FIG. 4, it can be seen that the torque per cylinder developed by cylinders 22A and 22B after point 62 (i.e. after time $t_1$) greater than the torque per cylinder developed by cylinders 22C and 22D after time $t_1$. However, the average torque, when taken over all engine cylinders 22A–22D, is the desired average torque per cylinders, as shown in FIG. 4 as line 68. Graphically, the average of torque trajectories 84 and 86 is torque trajectory 64 in FIG. 4.

From point 72, at time $t_2$, cylinders 22C and 22D continue to point 76 at time $t_3$, to operating in the HCCI mode while cylinders 22A and 22B continue to operate in the SI mode. However, since the desired torque per cylinder, at time $t_3$, is much higher than torque per cylinder at point 76 (time $t_3$) at which 22C and 22D are operating, cylinders 22A and 22B provide makeup torque by traversing from point 70 to point 74 at t=$t_3$, so that net engine torque equals desired torque. Continuing from point 74 at time $t_3$, cylinders 22A and 22B operate in the SI mode. However, beyond time $t_3$, if cylinders 22C and 22D continued to operate in the HCCI mode, engine 10 would be unable to provide net torque with any engine cylinders operating at HCCI. Thus, at time $t_3$ cylinders 22C and 22D make a transition to SI operation and proceed from point 76 to point 66 at time $t_4$. Cylinders 22A and 22B continue operating at SI mode at the engine proceed from time $t_3$ to time $t_4$ (i.e., proceeds from point 74 to 66). Thus, at the end of the illustrated torque trajectory, all engine cylinders are operating at the SI combustion mode at point 66 (i.e., at time $t_4$. The particular transition points and trajectories (lines 84 and 86) shown in FIG. 4 are an example by which the present invention can be used. Alternate trajectories, may be preferred for noise, vibration, fuel efficiency, emissions, or other reasons.

Figure 5:
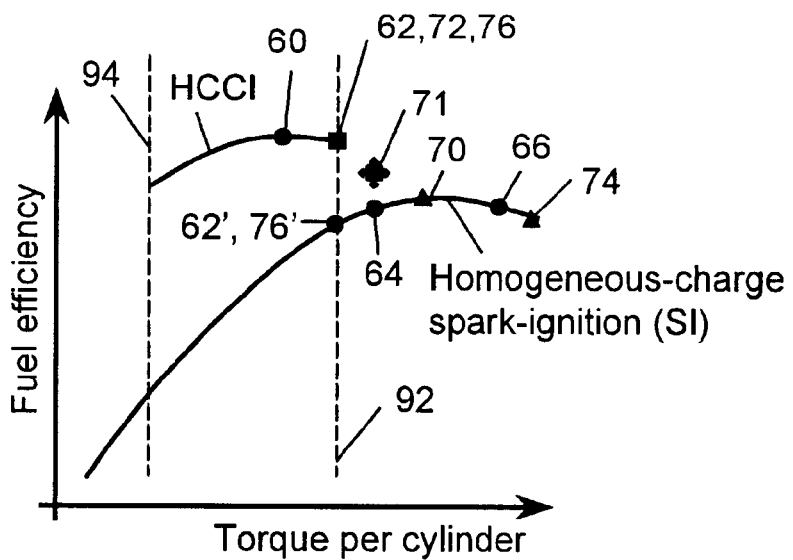
FIG. 5 is a graph of fuel economy as a function of torque for a HCCI combustion mode and a WR combustion mode.

Referring now to FIG. 5, fuel efficiency as a function of torque per cylinder is shown for both HCCI and SI operation. Fuel efficiency is defined herein as a torque produced per mass of fuel consumed. HCCI can be operated between limits 92 and 94; thus, the HCCI fuel efficiency curve is defined between dashed lines 92 and 94 only this range is shown in FIG. 5. SI operation is shown over a wider range than for HCCI. SI fuel efficiency is known to increase with torque, except at the highest torques at which fuel efficiency drops off. As discussed above, HCCI provides significantly higher fuel efficiency than SI operation. Thus, for maximizing fuel efficiency, it is desirable to operate at HCCI combustion, whenever possible.

Continuing to refer to FIG. 5, points 60, 62, 64, 66, 70, 72, 74, and 76 on the torque trajectories of FIG. 4 are plotted on the fuel efficiency curves of FIG. 5. A torque trajectory, according to the prior art, starts with all cylinders operating at point 60 on the HCCI fuel efficiency curve. An increase in torque to point 64 is accomplished by operating all cylinders at HCCI to point 62, i.e., continuing to take advantage of high fuel efficiency. However, according to the prior art, a transition occurs with all cylinders operating in the SI mode, thereby dropping fuel efficiency from point 62 to point 62'. (A point 62' does not occur in FIG. 4 because it is a plot of torque vs. time and does not show the third dimension of fuel efficiency, which is shown here in FIG. 5.) Continued increases in torque are met by all cylinders operating at SI combustion mode and moving to points 64 and 66 in FIG. 5.

According to the present invention, the torque trajectory for cylinders 22A and 22B map onto the fuel efficiency curve as: 60 to 62 to 62' to 70 to 74 to 66. The transition from HCCI to SI combustion occurs between points 62 and 62'. Point 62' occurs at time $t_1^+$, that is, a time shortly after time $t_3$ which allows time for the HCCI to SI transition to occur. The fuel efficiency from cylinders 22A and 22B (i.e., the cylinders which switched from the HCCI mode to the SI mode) is not very much different than the prior art, in which the torque trajectory causes the cylinders to go through fuel efficiency points 60-62-62'-64-66. However, according to the present invention, the torque trajectory of cylinders 22C and 22D (i.e., the cylinders which remained in the HCCI mode) from time t=0 to time t=$t_3$ causes those cylinders to access points 60-62-72-76-76'-66. The transition between HCCI and SI in cylinders 22C and 22D occurs between points 76 and 76'. Point 76 occurs at t=$t_3$ and point 76' occurs at t=$_3^+$, i.e., some short period of time after $t_3$ to allow the transition from HCCI to SI to occur. Cylinders 22C and 22D remain at HCCI operation through points 60-62-72-76 (i.e., through time $t_3$), thereby providing high fuel efficiency for most of the torque trajectory. The overall fuel efficiency, according to the present invention in which cylinders 22A and 22B operate according to a different combustion mode than cylinders 22C and 22D, is higher than the prior art. An example point, to illustrate this improvement over the prior art is shown in FIG. 5. To provide the torque desired at point 64, the fuel efficiency and torque per cylinder for cylinders 22A–22D, according to the prior art, is shown as point 64. However, according to the present invention, the fuel efficiency and torque per cylinder for cylinders 22A and 22B is that shown as point 70 and from cylinders 22C and 22D is shown as point 72. Thus by the present invention, overall fuel efficiency and average torque per cylinder for the engine is point 71, which is an improvement in fuel efficiency compared to the prior art, i.e., point 64.

The example shown in FIG. 5 is a case in which the LR combustion mode has higher fuel efficiency than the WR combustion mode with which it is paired. Similar examples can be drawn for cases in which the LR combustion mode provides other desirable operational characteristics such as low emissions or quiet combustion.

The example illustrated in FIG. 5 is a case in which the operator demanded torque is greater than that provided by HCCI, i.e., upper limit of HCCI. From FIG. 3, HCCI is also limited at a lower torque. A strategy, similar to that described above in regards to an upper torque limit for HCCI, is employed for the lower torque limit. In particular, some cylinders operate at HCCI at a higher torque and other cylinders operate at SI with a lower torque so that the net torque provided by the cylinders is the desired torque.

In another embodiment, some cylinders can operate at HCCI and other cylinders deactivated or turned off. If operating with four cylinders, one example is to have two cylinders providing the desired net engine torque from the engine.

Figure 6A:
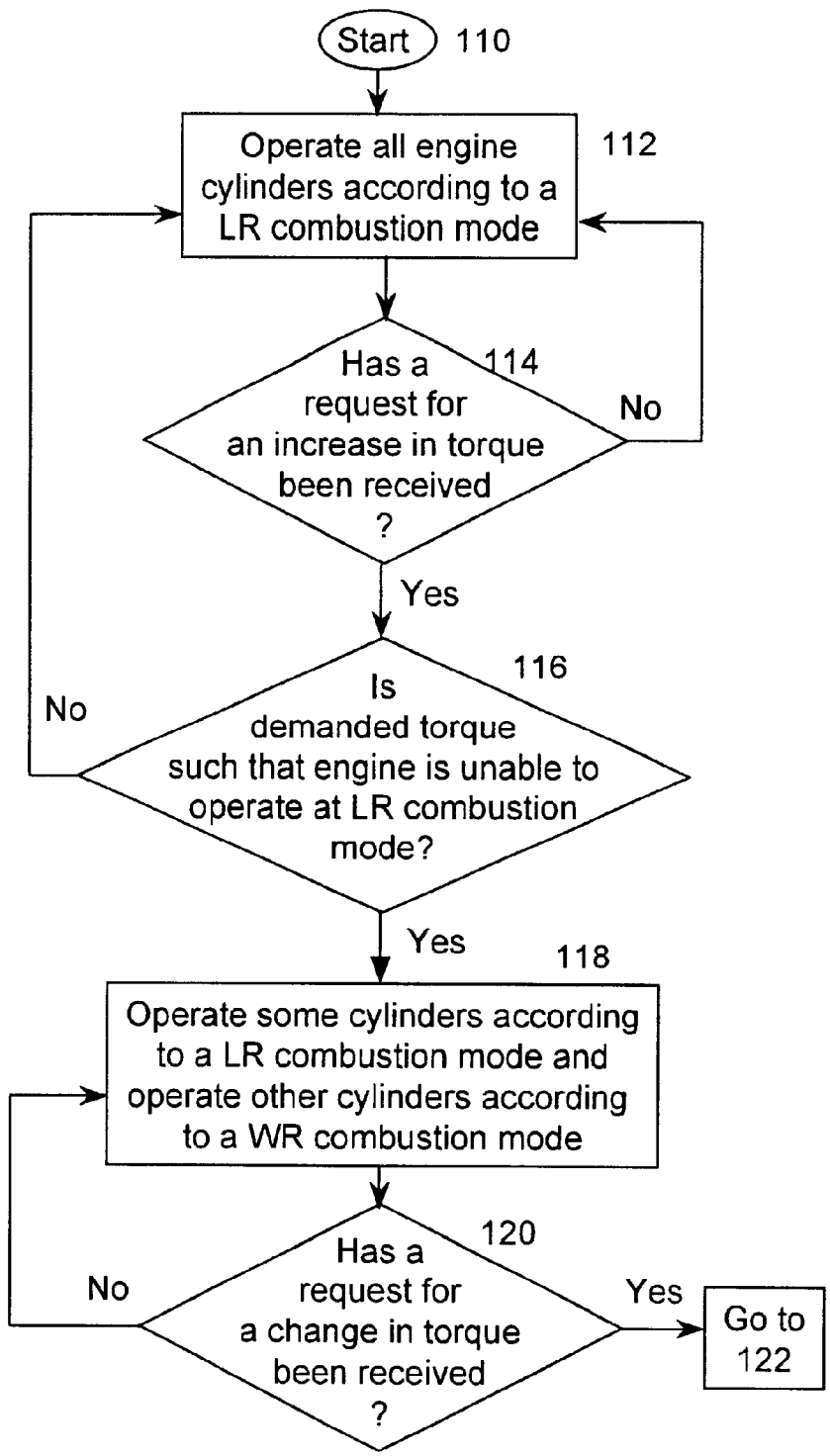

In FIG. 6A, an operating strategy according to the present invention is shown starting in step 110. Within FIGS. 6A–6C, a first combustion mode and a second combustion mode are mentioned. The first combustion mode is a LR combustion mode, such as DISC or HCCI. In the present discussion, DISC is used as an example for the first combustion mode. The second operating mode is a WR combustion mode, such as homogeneous-charge, spark-ignition combustion or heterogeneous-charge, compression-ignition combustion. Within discussion regarding to FIGS. 6A–6C, the second combustion mode is referred to as homogeneous-charge, spark-ignition combustion (SI for an abbreviation), for the purposes of illustrating an example case.

In step 112 of FIG. 6A, all cylinders 22A–22D of engine 10 are operating according to DISC combustion. Typically, this occurs after the engine has had an opportunity to warm to a nearly steady state temperature condition (step not shown in FIG. 6A). From step 112, control passes to step 114 in which a check is made to determine if a request for an increase in torque has been received. If not, control returns to step 112. If an increase in torque is received, control passes to 116, in which it is determined whether the new demanded torque is greater than the amount of torque within the operating region for DISC when all cylinders are operated according to DISC. If not, control returns to step 112. If a positive result in step 116, control passes to step 118 in which a portion of engine cylinders (cylinders 22A and 22B, by way of example) operate at DISC combustion and the other cylinders (22C and 22D) transition to operating at SI combustion. Control passes to step 120 in which it is determined if a request for a change in torque has been received. If not, control returns to step 118. If a positive result from step 120, control passes to step 122, which is found in FIG. 6B.

In step 122 of FIG. 6B, it is determined whether the demand is for an increase or decrease in torque. If a decrease, control passes to step 124 in which it is determined whether the new demanded torque is such that all engine cylinders 22A–22D can be operated under DISC and still provide the demanded torque. If not, control returns to step 118. If positive in step 124, control returns to step 112 in which all engine cylinders 22A–22D are operated with DISC combustion.

Continuing to refer to FIG. 6B, if an increase in torque is determined in step 122, control passes to step 132, in which it is determined whether the new demanded torque can be produced when operating as described in step 118, that is, with cylinders 22A and 22B operating according to DISC combustion and cylinders 22C and 22D operating according to SI combustion. That is, a determination is made as to whether the demanded torque is within a predetermined range of torque. If a positive result, control returns to step 118. If not, a transition is made so that all cylinders are operating according to SI combustion. Specifically, in the present example, cylinders 22A and 22B make a transition from DISC to SI combustion mode.

Control now passes from step 134 to step 138, the latter shown in FIG. 6C. In step 138, it is determined whether a decrease in torque has been demanded. If no, control returns to step 134. If a positive result from step 138, control passes to 140, in which it is determined whether the demanded torque can be produced when operating according to that described in step 118. If not, control returns to step 134.

If so, control passes to step 118 in which a transition is made. Specifically, a portion of engine cylinders 22A and B transition from SI to DISC combustion. Operation continues according to that shown in FIGS. 6A–6C until a request for engine shutdown interrupts.

FIGS. 6A–6C are discussed with DISC being the LR combustion mode and SI combustion mode being the WR combustion mode. FIGS. 6A–6C apply, more generally, to all LR and WR combustion modes. Discussion in 6A–6C does refer to the upper torque limit of the LR combustion mode. HCCI, as an example, also has a lower limit of operation. The invention, as described in FIGS. 6A–6C, also applies to a lower limit of operation. The differences in FIGS. 6A–6C are that each determination about a torque increase is for a torque decrease and vice versa.

Herein, discussion has focused on two groups of cylinders. However, the invention can be extended to any groups of cylinders, with groups, subsets, or portions comprising as few as one cylinder. That is, a transition from one operating mode to another can be carried out one cylinder at a time. More than two combustion modes can be utilized within the engine.

While several modes for carrying out the invention have been described in detail, those familiar with the art to which this invention relates will recognize conventional designs and embodiments for practicing the invention. The above-described embodiments are intended to be illustrative of the invention, which may be modified within the scope of the following claims.

We claim:

1. A method for controlling an internal combustion engine having a plurality of cylinders, comprising:

operating a first portion of the cylinders according to a first combustion mode wherein said first combustion mode is homogeneous charge compression ignition combustion in which said spark plug is disabled; and operating a second portion of the cylinders according to a second, different combustion mode.

2. The method of claim 1 including operating the plurality of cylinders to produce from the engine a net torque substantially equal to an operator demanded engine torque.

3. The method of claim 1 wherein said first combustion mode is limited to operation within a lesser range in torque than said second combustion mode.

4. The method of claim 3 wherein said limitation of said first combustion mode is based on said first combustion mode exceeding a predetermined level of an engine parameter.

5. The method of claim 4 wherein said engine parameter is at least one of soot emission, NOx emission, hydrocarbon emission, noise, combustion harshness, combustion instability, and fuel consumption, said fuel consumption being inversely related to fuel efficiency.

6. The method of claim 1 wherein said homogeneous-charge, compression-ignition combustion is a combustion mode in which fuel and oxidizer are substantially homogeneously mixed prior to ignition and ignition occurs via autoignition and said second combustion modes is a homogeneous-charge, spark-ignition combustion mode in which fuel and oxidizer are substantially homogeneously mixed prior to ignition and ignition occurs via spark ignition.

7. The method of claim 1 wherein said homogeneous-charge, compression-ignition combustion is a combustion mode in which fuel and oxidizer are substantially homogeneously mixed prior to ignition and ignition occurs via autoignition and said second combustion mode is a heterogeneous-charge, compression-ignition combustion mode in which fuel and oxidizer are mostly unmixed at the time of ignition and ignition occurs via autoignition.

8. A system for controlling a multi-cylinder internal combustion engine, comprising:

a first group of cylinders operating by homogeneous charge compression ignition combustion in which a spark plug coupled to said first group of cylinders is disabled;

a second group of cylinders operating according to a combustion mode other than homogeneous charge compression ignition combustion; and an engine controller operably coupled to said first and second groups of cylinders, said controller determining a first operating condition to provide a first torque by said first group of cylinders and a second operating condition to provide a second torque by said second group of cylinders, a sum of said first and second torques being substantially equal to an operator demanded torque.

9. The system of claim 8 wherein said homogeneous-charge, compression-ignition combustion is a combustion mode in which fuel and oxidizer are substantially homogeneously mixed prior to ignition, ignition occurs via autoignition, and said first torque is within a predetermined torque range.

10. The system of claim 9 wherein said predetermined torque range has a lower torque limit and an upper torque limit, said lower torque limit is based on engine stability and said upper torque limit is based on combustion harshness.

11. The system of claim 10 wherein said engine stability is based on a standard deviation of engine power produced by individual cylinders.

12. The system of claim 10 wherein said harshness is based on a time rate of change of cylinder pressure.

13. The system of claim 9, further comprising: deactivating said second group of cylinders when an operator demanded torque is below said lower torque limit.

14. A system for controlling torque in an internal combustion engine having a plurality of cylinders with spark plugs coupled to the cylinders, the system comprising: an electronic control unit operably connected to engine cylinders, said electronic control unit commanding the plurality of cylinders to operate at a first combustion mode in which the spark plugs are disabled; said electronic control unit commanding a transition, in response to a demand for a change in torque to a torque outside of a predetermined range, from operating the engine with the plurality of cylinders in said first combustion mode to operating such engine with a first portion of the plurality of cylinders remaining in the first combustion mode while a second portion of the cylinders transitions to operate in a different combustion mode.

15. The system of claim 14 wherein said first combustion mode is a limited range combustion mode and said different combustion mode is a wide range combustion mode.

16. The system of claim 14 wherein said predetermined range is a torque range in which said first combustion mode provides an acceptable level of a performance parameter.

17. The system of claim 16 wherein said performance parameter is exhaust emissions and said acceptable level is based on a target emission standard.

18. The system of claim 16 wherein said performance parameter is combustion harshness which is based on a rate of pressure rise in said engine cylinders and said acceptable level is based on a target harshness criterion.

19. The system of claim 16 wherein said performance parameter is combustion stability which is determined based on standard deviation of power produced in engine cylinders on a cycle-by-cycle basis and said acceptable level is based on a target standard deviation criterion.

20. A method for controlling torque in an internal combustion engine having a plurality of cylinders with spark plugs coupled to the cylinders, the method comprising:

operating the plurality of cylinders at a first combustion mode in which said spark plugs are disabled; and transitioning, in response to a demand for a change in torque to a torque outside of a predetermined range, from operating the engine with the plurality of cylinders in the first combustion mode to operating such engine with a first portion of the plurality of cylinders remaining in said first combustion mode while a second portion of the cylinders transitions to operate in a different combustion mode in which said spark plugs are active.

21. The method of clam 20 wherein the sum of torque provided by engine cylinders substantially equals demanded torque.

22. The method of claim 20 wherein said first combustion mode is one of: homogeneous-charge compression-ignition, MK, stratified-charge compression-ignition, smokeless rich, and partial homogeneous-charge compression-ignition combustion; and said different combustion mode is one of homogenous-charge spark-ignition combustion.

23. The method of claim 20 wherein said transition is accomplished when operating said first portion of engine cylinders according to said first combustion mode and said second portion of engine cylinders according to said second combustion mode provides a higher fuel efficiency than operating said first and second portions of engine cylinders according to said first combustion mode.

24. The method of claim 20 wherein after said transition a torque provided by said portion of cylinders operating in said first combustion mode is unequal to a torque provided by said different portion of cylinders operating in said different combustion mode.

25. A method for controlling torque in a multi-cylinder internal combustion engine to respond to a demand for a change in torque, comprising:

operating a first portion of engine cylinders according to a first combustion mode and operating a second portion of engine cylinders according to a second combustion mode, said first and second combustion modes being different and one of said first and second combustion modes is homogeneous charge compression ignition combustion in which said spark plug is disabled; and transitioning operation in said second portion of engine cylinders to said first combustion mode in response to the demand for a change in engine torque.

26. The method recited in claim 25 wherein the sum of torque provided by engine cylinders substantially equals demanded engine torque.

27. The method of claim 25 wherein said first combustion mode is homogeneous change compression ignition combustion which is a limited range combustion mode, said second combustion mode is a wide range combustion mode, and said transition is accomplished when operating said first and second portions of engine cylinders according to said first combustion mode provides higher fuel efficiency than operating said first portion according to said first combustion mode and said second portion according to said second combustion mode.

28. The method of claim 25 wherein said first combustion mode is a wide range combustion mode, said second combustion mode is homogeneous charge compression ignition combustion which is a limited range combustion mode, and said transition is accomplished when net engine torque provided by operating said first portion of engine cylinders according to said first combustion mode and said second portion of engine cylinders according to said first combustion mode is less than operator demanded torque.

29. The method of claim 25 wherein prior to said transition a torque provided by said first portion of cylinders operating at said first combustion mode is substantially different from a torque provide by said second portion of cylinders operating at said second combustion mode.

30. A method for controlling torque in a multi-cylinder internal combustion engine during a demand for a change in torque, comprising:

operating a first portion of engine cylinders according to a wide range combustion mode and operating a second portion of engine cylinders according to a limited range combustion mode wherein said limited range combustion mode is homogeneous charge compression ignition combustion in which spark plugs in said second portion of engine cylinders are disabled; and transitioning operation in said second portion of engine cylinders to said wide range combustion mode when said demanded torque is greater than a first predetermined torque.

31. The method of claim 30, further comprising: transitioning operation in said first portion of engine cylinders to said limited range combustion mode when said demanded torque is less than a second predetermined torque.

32. The method of claim 30 wherein a net torque provided by engine cylinders substantially equals demanded engine torque.

33. The method of claim 31 wherein said limited range combustion mode is limited in operating range at both a lower torque limit and an upper torque limit.

34. The method of claim 33 wherein said lower torque limit is based on combustion stability and said upper torque limit is based on combustion harshness.

* * * * *